(12) United States Patent
Murata et al.

(10) Patent No.: US 8,360,927 B2
(45) Date of Patent: Jan. 29, 2013

(54) VEHICLE POWER TRANSMISSION DEVICE

(75) Inventors: Sohei Murata, Chiryu (JP); Ryuji Ibaraki, Nishikamo-gun (JP); Ryuichi Hasegawa, Aichi-gun (JP); Shigetsugu Iwata, Toyota (JP); Yoshinori Morita, Toyota (JP); Makoto Tomita, Nagoya (JP); Takafumi Koshida, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 198 days.

(21) Appl. No.: 12/899,044

(22) Filed: Oct. 6, 2010

(65) Prior Publication Data

US 2011/0092333 A1    Apr. 21, 2011

(30) Foreign Application Priority Data

Oct. 16, 2009   (JP) .................................. 2009-239077

(51) Int. Cl.
*F16H 57/08*   (2006.01)
(52) U.S. Cl. .................... 475/347; 475/331; 475/346
(58) Field of Classification Search ........ 475/5, 149–152, 475/331, 337, 339, 346, 347; 74/650, 606 R
See application file for complete search history.

(56) References Cited

U.S. PATENT DOCUMENTS

| 4,020,716 A * | 5/1977 | Toth et al. ..................... 475/337 |
| 4,649,772 A * | 3/1987 | Daniel et al. .................. 475/331 |
| 2009/0093335 A1 * | 4/2009 | Yokouchi et al. ............. 475/323 |
| 2010/0227725 A1 | 9/2010 | Inayoshi |

FOREIGN PATENT DOCUMENTS

| JP | 2004-116737 | 4/2004 |
| JP | 2005-308094 | 11/2005 |
| JP | 2007-326420 | 12/2007 |
| JP | 2009-58002 | 3/2009 |
| WO | WO 2007/074595 A1 | 7/2007 |

OTHER PUBLICATIONS

Japanese Office Action issued Aug. 16, 2011, in Patent Application No. 2009-239077 (with English-language translation).

* cited by examiner

*Primary Examiner* — Justin Holmes
(74) *Attorney, Agent, or Firm* — Oblon, Spivak, McClelland, Maier & Neustadt, L.L.P.

(57) ABSTRACT

A vehicle power transmission device having a structure with a carrier of a planetary gear device brought into spline fitting with a case that is a non-rotating member to stop rotating and a ring gear of the planetary gear device rotatably supported by the case via a bearing, is provided with a play reducing device that presses the carrier against the case to reduce a play in thrust direction formed between the carrier and the case.

9 Claims, 9 Drawing Sheets

VEHICLE POWER TRANSMISSION DEVICE

BACKGROUND OF THE INVENTION

1. Field of the Invention

The present invention relates to a vehicle power transmission device, and, more particularly, to a technique of suppressing rattling of a planetary gear device included in the power transmission device.

2. Description of the Related Art

Conventionally, a planetary gear device is included in a vehicle power transmission device including an automatic transmission, a power distribution mechanism of a hybrid vehicle, etc., and power output from a drive source is output to a drive wheel via the planetary gear device. Such a planetary gear device may have a carrier that is brought into spline fitting with a case that is a non-rotating member to constantly stop the rotation of the carrier. One example is a support structure of a rotating member of Japanese Laid-Open Patent Publication No. 2005-308094, for example. Japanese Laid-Open Patent Publication No. 2005-308094 discloses the structure having a carrier of a planetary gear device in spline fitting with a case and discloses a technique of suppressing noise generated in the structure. Specifically, if the carrier of the planetary gear device is in spline fitting with the case, a gap (play) is formed in the thrust direction and the circumferential direction between the carrier and the case and, when rotational fluctuations transmitted from a drive source are transmitted to the carrier, the carrier and the case repeatedly collide in the thrust direction and the circumferential direction due to the rotational fluctuations and the collides (rattling) are transmitted as noise through the case to a driver. On the other hand, Japanese Laid-Open Patent Publication No. 2005-308094 describes that the generation of noise is suppressed by restricting the location of the spline fitting of the carrier and the case to a location with relatively low sensitivity to the noise (a location with relatively high rigidity) in the circumferential direction of the case.

However, a structure described in Japanese Laid-Open Patent Publication No. 2005-308094 does not constrain collision of a carrier and a case (rattling) and is not necessarily a sufficient solution of the problem. Therefore, a technique has been requested that constrains the rattling itself. On the other hand, a technique is also conceivable that constrains the rattling through control. Specifically, in a range tending to generate the rattling, an operating point of the drive source is changed to an operating point that constrains the occurrence of the rattling. However, when the rattling is suppressed through the control, the operating point of the drive source (engine) for avoiding the rattling deviates from an operating point for optimum fuel cost as depicted in FIG. 9, it is problematic that a fuel cost performance of vehicle deteriorates. As depicted in FIG. 9, it is also problematically difficult to generate sufficient power in a lower rotation speed range of the drive source. Therefore, the rattling constraint through the control is not certainly a means of preferably suppressing the rattling since the fuel cost deterioration and the insufficient drive force are problematically generated while the rattling is suppressed.

SUMMARY OF THE INVENTION

The present invention was conceived in view of the situations and it is therefore the object of the present invention to provide a vehicle power transmission device including a planetary gear device and having a structure with a carrier of the planetary gear device brought into spline fitting with a case to stop rotation and a ring gear rotatably supported by the case via a bearing and capable of preferably suppressing rattling generated between the carrier and the case.

To achieve the object, the first aspect of the present invention provides (a) a vehicle power transmission device having a structure with a carrier of a planetary gear device brought into spline fitting with a case that is a non-rotating member to stop rotating and a ring gear of the planetary gear device rotatably supported by the case via a bearing, (b) the vehicle power transmission device being provided with a play reducing device that presses the carrier against the case to reduce a play in thrust direction formed between the carrier and the case.

According to the second aspect of the invention, in the vehicle power transmission device recited in the first aspect of the invention, the play reducing device is a plate spring interposed in abutment with the bearing and the carrier to press the carrier against the case.

According to the third aspect of the invention, in the vehicle power transmission device recited in the first aspect of the invention, the play reducing device is a spacer interposed in abutment with the bearing and the carrier to generate a preload to press the carrier against the case.

According to the fourth aspect of the invention, in the vehicle power transmission device recited in the first aspect of the invention, the play reducing device is an elastic member interposed in abutment with the bearing and the carrier to generate a preload to press the carrier against the case.

According to the fifth aspect of the invention, in the vehicle power transmission device recited in the first aspect of the invention, the play reducing device is a snap ring fitted into one member of the case and the carrier to pinch the other member with the one member to press the carrier against the case.

According to the sixth aspect of the invention, in the vehicle power transmission device recited in the first aspect of the invention, the case and the carrier are unrotatably held by forming spline fitting between a plurality of spline teeth circumferentially formed on an outer periphery surface of the carrier and spline grooves circumferentially formed in the case at positions corresponding to the spline teeth.

In a vehicle power transmission device recited in the first aspect of the invention, since a play reducing device is provided that presses the carrier against the case to reduce a play in the thrust direction between the carrier and the case, a play is reduced in the thrust direction (axial direction) between the carrier and the case and a relative displacement is suppressed in the thrust direction between the carrier and the case to prevent the sound generated when the carrier and the case collide in the thrust direction. A friction force between the carrier and the case generated by pressing the carrier against the case can constrain the rattling due to collisions of the members generated by reduction of a spline play formed in the circumferential direction (rotational direction) between the carrier and the case.

In a vehicle power transmission device recited in the second aspect of the invention, since the play reducing device is the plate spring interposed in abutment with the bearing and the carrier to press the carrier against the case, the pressing force of the plate spring reduces a play in the thrust direction of the carrier and presses the carrier against the case to restrict the rotational fluctuations of the carrier and the case in the circumferential direction with the friction force. Therefore, the rattling between the carrier and the case and the fluctuation of the carrier in the thrust direction can effectively be suppressed. Since the plate spring is disposed by abutting on the end surface of the bearing, a fixing member such as a snap ring for fixing the plate spring is not necessary and the play reducing device can easily be configured without making a considerable change in a conventional structure.

In a vehicle power transmission device recited in the third aspect of the invention, since the spacer is interposed in abutment with bearing and the carrier such that a preload is generated, the carrier is pressed against the case by the preload to reduce a play in the thrust direction, and the rotational fluctuations of the carrier and the case are restricted in the circumferential direction by a friction force between the carrier and the case generated due to the preload. Therefore, the rattling between the carrier and the case and the fluctuations of the carrier in the thrust direction can effectively be suppressed. Since the function of the play reducing device is implemented by only interposing the spacer, the play reducing device can easily be configured without making a considerable change in a conventional structure.

In a vehicle power transmission device recited in the fourth aspect in the invention, since the elastic member is interposed in abutment with the bearing and the carrier such that a preload is generated, the carrier is pressed against the case by the preload to reduce a play in the thrust direction, and the rotational fluctuations of the carrier and the case are restricted in the circumferential direction by a friction force between the carrier and the case generated due to the preload. Therefore, the rattling between the carrier and the case and the fluctuations of the carrier in the thrust direction can effectively be suppressed. Since the function of the play reducing device is implemented by only interposing the elastic member, the play reducing device can easily be configured without making a considerable change in a conventional structure.

In a vehicle power transmission device recited in the fifth aspect in the invention, since the snap ring is fitted into one member of either the case or the carrier and pinches the other member with the one member, the carrier is pressed against the case to reduce a play in the thrust direction, and the rotational fluctuations of the carrier and the case are restricted in the circumferential direction by a friction force associated with the pinching force generated when the other member is pinched. Therefore, the rattling between the carrier and the case and the fluctuations of the carrier in the thrust direction can effectively be suppressed.

In a vehicle power transmission device recited in the sixth aspect of the invention, the case and the carrier are unrotatably held by forming the spline fitting between a plurality of the spline teeth circumferentially formed on the outer periphery surface of the carrier and the spline grooves circumferentially formed in the case at the positions corresponding to the spline teeth. Although this necessarily leads to formation of gaps (spline plays) between the spline teeth of the carrier and the spline grooves of the case and causes the rattling generated between the carrier and the case, the play reducing device constrains the rattling to implement the practical vehicle power transmission device.

It is preferred that a location for the spline fitting between a spline tooth of the carrier and a spline groove of a case be restricted to a location having relatively high rigidity in the case. This prevents durability of the case from deteriorating and reduces transmission of noise generated by rattling between the spline tooth and the spline groove.

DESCRIPTION OF THE PREFERRED EMBODIMENTS

Exemplary embodiments of the present invention will now be described with reference to the accompanying drawings. The figures are simplified or modified as needed in the following embodiments and do not necessarily depict portions with correct dimensional ratios, shapes, etc.

First Embodiment

Figure 1:
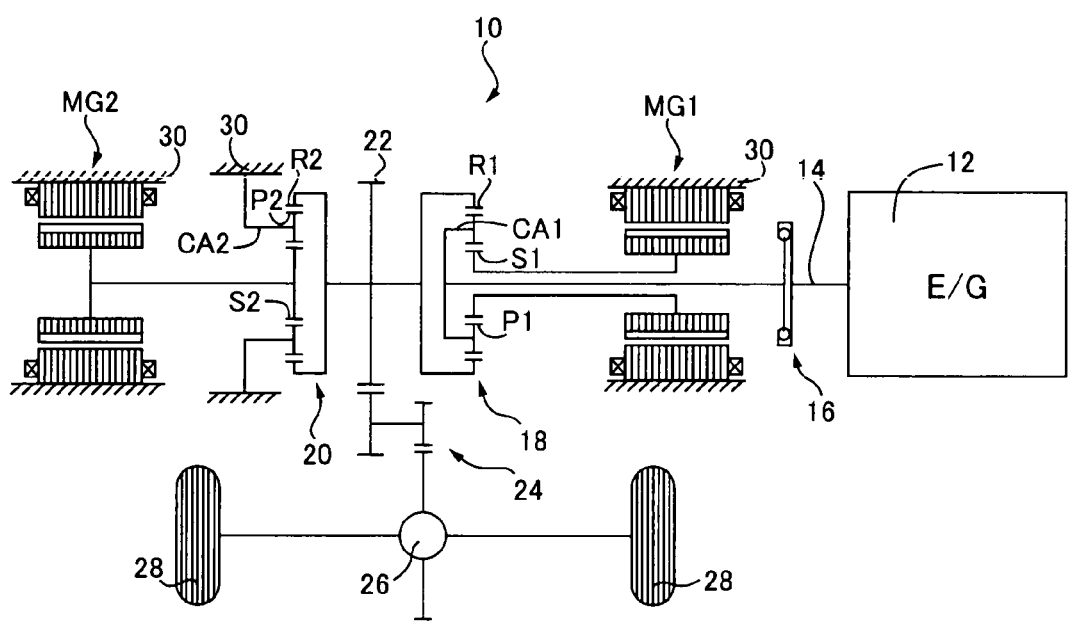
FIG. 1 is a schematic of a hybrid vehicle power transmission device to which the present invention is applied.

FIG. 1 is a schematic of a hybrid vehicle power transmission device 10 (hereinafter, power transmission device 10) to which the present invention is applied. As depicted in FIG. 1, the power transmission device 10 includes an engine 12, a first planetary gear device 18 acting as a power distribution mechanism coupled through a damper device 16 to a crankshaft 14 of the engine 12, a first electric motor MG1 coupled to the first planetary gear device 18 in a power transmissible manner, a second planetary gear device 20 as a reduction gear connected to the first planetary gear device 18, and a second electric motor MG2 coupled to the second planetary gear device 20 in a power transmissible manner.

The first electric motor MG1 and the second electric motor MG2 are so-called motor generators having a power generating function and the first electric motor MG1 acts as a differential electric motor for controlling a differential state of the power distribution mechanism 16 and at least includes a generator (power generating) function for generating a reaction force. The second electric motor MG2 coupled to drive wheels 28 in a power transmissible manner acts as an electric motor for traveling that outputs a drive power as a drive power source for traveling and therefore at least includes a motor (electric motor) function.

The first planetary gear device 18 is made up of a single pinion type planetary gear device and includes a sun gear S1, a ring gear R1 coaxially arranged with the sun gear S1 and engaging with the sun gear S1 via a pinion gear P1, and a carrier CA1 that supports the pinion gear P1 in a rotatable and revolvable manner. The sun gear S1 of the first planetary gear device 18 is coupled to the first electric motor MG1; the carrier CA1 is coupled to the engine 12; and the ring gear R1 is operationally coupled via an output gear 22, a reduction gear device 24, and a final reducer 26 to the right and left drive wheels 28.

The second planetary gear device 20 is made up of a single pinion type planetary gear device and includes a sun gear S2, a ring gear R2 coaxially arranged with the sun gear S2 and engaging with the sun gear S2 via a pinion gear P2, and a carrier CA2 that supports the pinion gear P2 in a rotatable and revolvable manner. The sun gear S2 of the second planetary gear device 20 is coupled to the second electric motor MG2; the carrier CA2 is coupled to a case 30 that is a non-rotating member; and the ring gear R2 is operationally coupled via the output gear 22, the reduction gear device 24, and the final reducer 26 to the right and left drive wheels 28 as is the case with the ring gear R1. The second planetary gear device 20 corresponds to a planetary gear device of the present invention.

In this embodiment, a so-called compound type compound gear 42 is used that has inner teeth of the ring gear R1 of the first planetary gear device 18 and inner teeth of the second ring gear R2 axially aligned and formed on the inner periphery side and outer teeth of the output gear 22 formed on the outer periphery side. By integrating a plurality of gear functions in the compound gear 42 as above, the power transmission device 10 is made compact.

Figure 2:
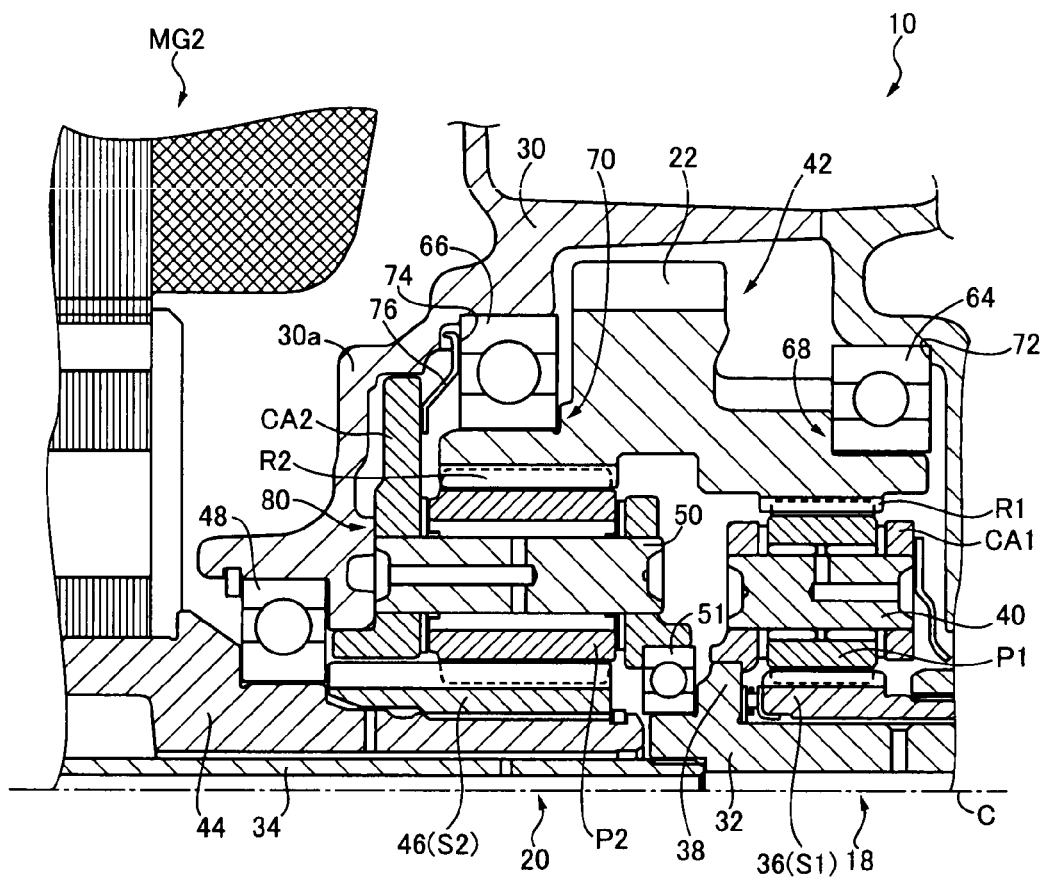
FIG. 2 is a partial enlarged cross-section view of a part representative of a relevant portion of the present invention in the power transmission device of FIG. 1.

FIG. 2 is a partial enlarged cross-section view of a part representative of a relevant portion of the present invention in the power transmission device 10 of FIG. 1. Specifically, FIG. 2 depicts a configuration around the first planetary gear device 18 and the second planetary gear device 20 of FIG. 1. As depicted in FIG. 2, the first planetary gear device 18 and the second planetary gear device 20 are axially aligned and disposed between the first electric motor MG1 and the second electric motor MG2. A first shaft 32 rotationally driven by the engine 12 and a second shaft 34 brought into spline fitting with the first shaft 32 to be integrally rotated with the first shaft 32 are rotatably disposed around a shaft center C on the inner periphery side of the first planetary gear device 18 and the second planetary gear device 20. The case 30, i.e., a non-rotating member is provided on the outer periphery side of the first planetary gear device 18 and the second planetary gear device 20 to cover the planetary gear devices (hereinafter, simply referred to as planetary gear devices if the first planetary gear device 18 and the second planetary gear device 20 are not distinguished).

In the first planetary gear device 18, the sun gear S1 is formed as a helical gear at an outer periphery end of a transmitting member 36 coupled to the first electric motor MG1 and the outer teeth of the sun gear S1 are engaged with the pinion gear P1 that is a helical gear rotatably supported by carrier pins 40. The carrier CA1 is coupled at an inner periphery end to an outer periphery end of a collar portion 38 radially extending from one end of the first shaft 32 to support both ends of the carrier pins 40 that rotatably hold the pinion gear P1. A plurality of carrier pins 40 is circumferentially disposed at regular angular intervals. Consequently, the carrier CA1 is integrally rotated with the engine 12 (the first shaft 32) while rotatably holding a plurality of the pinion gears P1. The ring gear R1 has inner teeth formed as a helical gear on an inner periphery surface of the annular compound gear 42 with the ring gear R2 of the second planetary gear device 20 and the output gear 22 formed and is engaged with the pinion gear P1 in a power transmissible manner. Due to the differential effect of the first planetary gear device 18, the power of the engine 12 is distributed to the output gear 22 and the first electric motor MG1 as needed.

In the second planetary gear device 20, the sun gear S2 has outer teeth formed as a helical gear on a cylindrically-shaped cylindrical member 46 brought into spline fitting with an outer periphery end of a transmitting member 44, having cylindrical shape, coupled to the second electric motor MG2. The sun gear S2 is engaged at the outer teeth with the pinion gear P2 that is a helical gear rotatably supported by carrier pins 50. The transmitting member 44 is rotatably supported by a partition wall 30a extending from the outer periphery portion of the case 30 toward the inner periphery side via a bearing 48. The carrier CA2 is always stopped rotating due to the spline fitting with the partition wall 30a of the case 30 at one end on the second electric motor MG2 side in the axial direction while supporting both ends of a plurality of (e.g., five, at regular angular intervals in a circle) the carrier pins 50 rotatably holding the pinion gear P2. Since a bearing 51 is disposed in the inner periphery portion at the other axial end of the carrier CA2, the first shaft 32 is rotatably supported by the case 30 via the bearing 51 and the carrier CA2. The ring gear R2 is formed as a helical gear on the inner periphery side of the compound gear 42 and the inner teeth thereof is engaged with the pinion gear P2. Therefore, the rotation of the second electric motor MG2 is reduced via the second planetary gear device 20 and output from the output gear 22.

Figure 3:
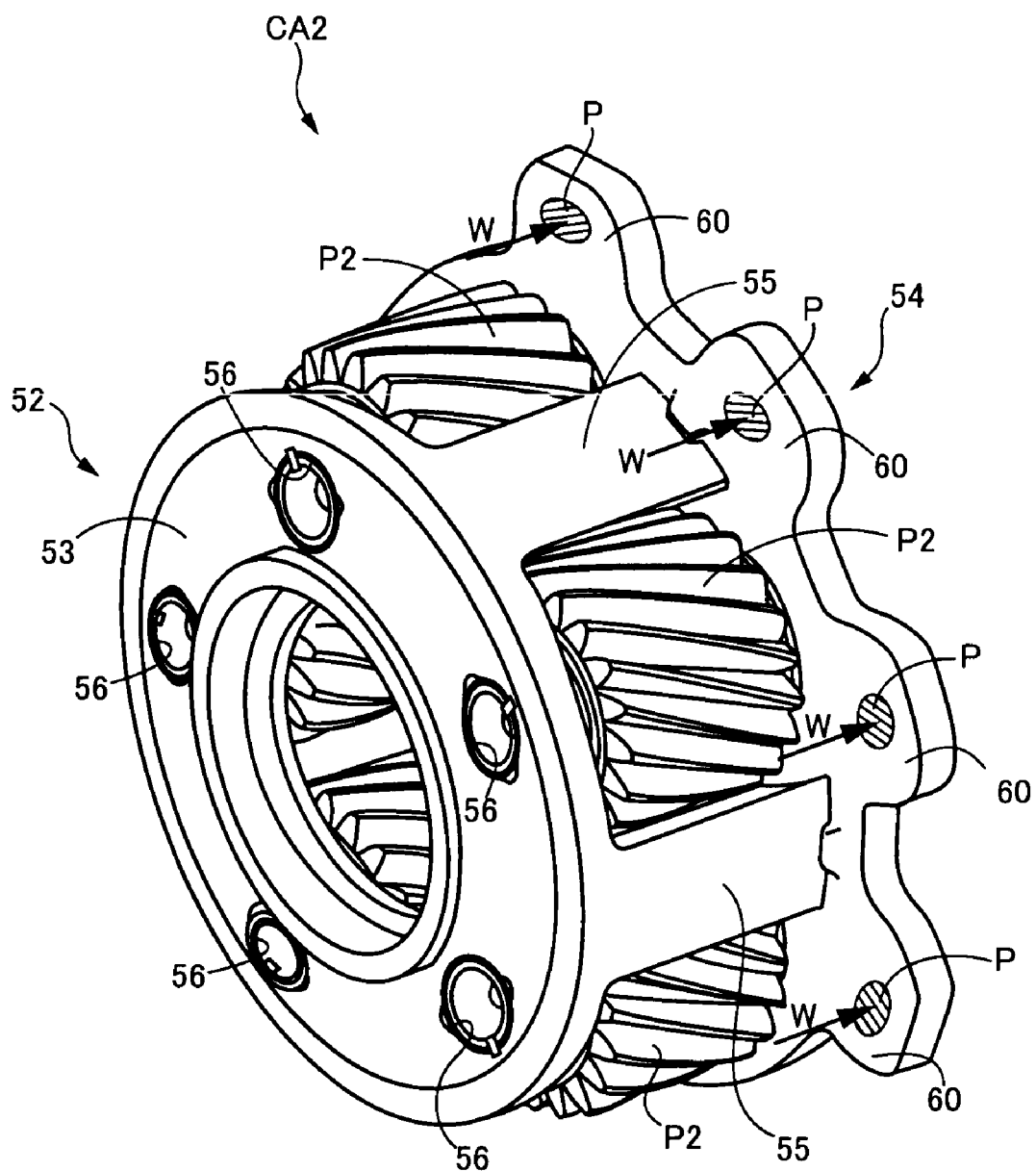
FIG. 3 is a perspective view for generally illustrating a state of pinion gears disposed in a carrier depicted in FIG. 2.

FIG. 3 is a perspective view for generally illustrating a state of the pinion gears P2 disposed in the carrier CA2 and, therefore, specific dimensions, etc., are slightly different. The carrier CA2 is made up of a pinion supporting portion 52 for rotatably supporting the pinion gears P2 with carrier pins 50 and a disk-shaped spline portion 54 brought into the spline fitting with the case 30. For example, the pinion supporting portion 52 and the spline portion 54 are separately manufactured and fixed to each other by welding, etc., with circumferential relative positions adjusted to each other. As depicted in FIG. 3, the pinion gear P2 is made up of a helical gear and the sun gear S2 and the ring gear R2 engaged with the pinion gear P2 are also made up of helical gears.

The pinion supporting portion 52 includes a disk portion 53 formed into a disk shape at one axially end and a plurality of coupling portions 55 extending from the outer periphery edge of the disk portion 53 in parallel with the shaft center and connected to the spline portion 54 at the end edges thereof. In this embodiment, the five coupling portions 55 are circumferentially provided at regular angular intervals. The disk portion 53 has carrier pin support holes 56 formed for fitting axial ends of the carrier pins 50 that rotatably support the pinion gears P2. The carrier pins 50 are fitted into the carrier pin support holes 56 and also into carrier pin support holes provided likewise on the spline portion 54 to be supported at both ends. The pinion gear P2 is rotatably supported with the carrier pin 50 penetrating therethrough and housed within the pinion supporting portion 52.

The spline portion 54 is connected to the end edges of the coupling portions 55 and is integrally rotated with the pinion supporting member 52. The spline portion 54 has a plurality of spline teeth 60 circumferentially formed on the outer periphery surface and projected toward the outer periphery side for fitting into spline grooves 62 described later formed on the inside of the partition wall 30a of the case 30. The spline teeth 60 are formed at positions that are locations having relatively high rigidity in the case 30, for example. Since the teeth are formed at the above locations, the durability of the case 30 is prevented from deteriorating and the transmission of noise generated by rattling between the case 30 and the carrier CA2 are reduced.

Figure 4:
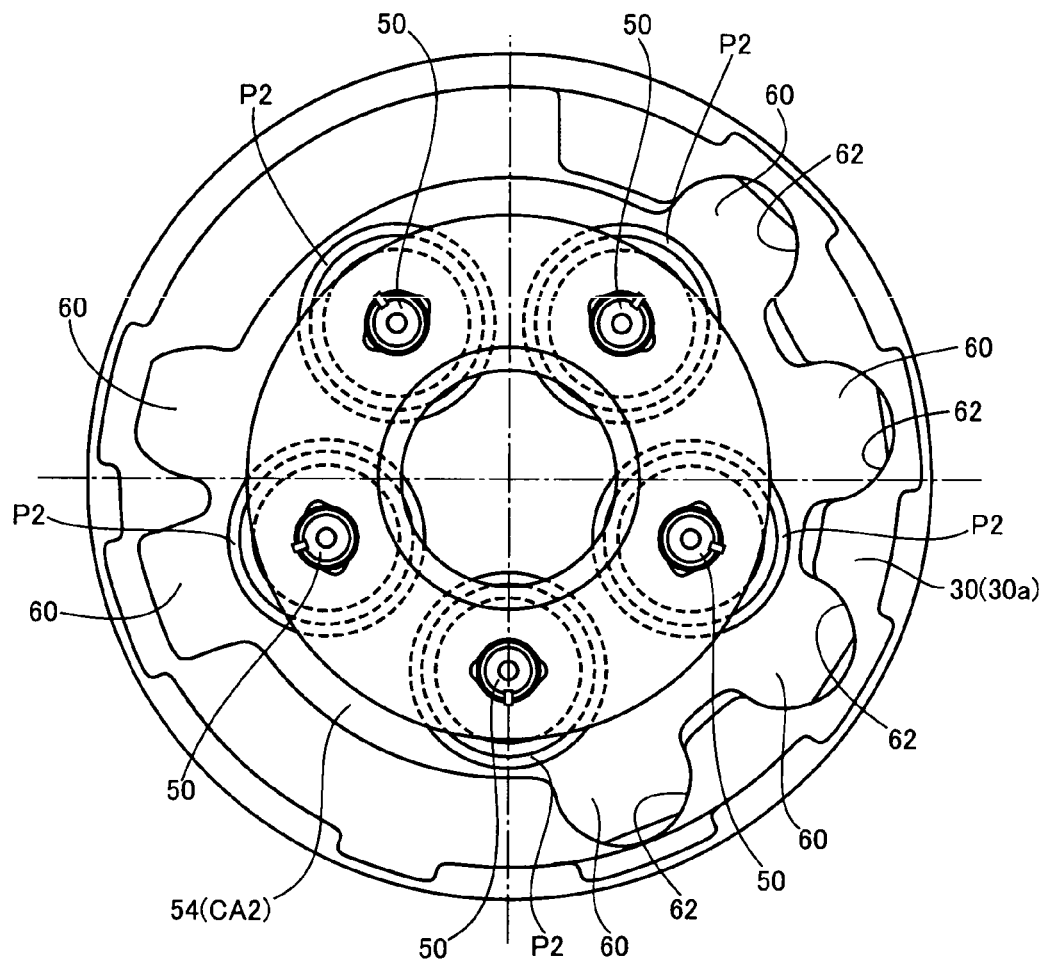
FIG. 4 is a diagram of a state of a partition wall of the case depicted in FIG. 2 and a spline fitting portion of the carrier depicted in FIG. 3 brought into spline fitting.

FIG. 4 depicts a state of the partition wall 30a of the case 30 and the spline portion 54 of the carrier CA2 brought into the spline fitting. As depicted in FIG. 4, a plurality of the spline teeth 60 circumferentially formed on the outer periphery surface of the spline portion 54 (the carrier CA2) is fitted into a plurality of spline grooves 62 formed circumferentially at the same rotational phase positions as the spline teeth 60 on the partition wall 30*a* (the case 30) to bring both into the spline fitting. As a result, the carrier CA2 (the spline portion 54) is unrotatably held. The spline teeth 60 and the spline grooves 62 correspond to a spline fitting portion of the present invention.

Referring to FIG. 2 again, the compound gear 42 is a cylindrical member that has the ring gear R1 of the first planetary gear device 18 and the ring gear R2 of the second planetary gear device 20 formed on the inner periphery side and the output gear 22 integrally formed on the outer periphery side and is rotatable supported around the shaft center C by the case 30 via bearings 64, 66 disposed on the both ends thereof. Since stepped surfaces of stepped portions 68, 70 formed on both axial sides on the outer periphery of the compound gear 42 abut on the end surfaces of the bearings 64 and 66, the movement of the compound gear 42, the bearing 64, and the bearing 66 are restricted in the axial direction. Specifically, since the end surfaces of the bearing 64 and the bearing 66 also abut on side walls 72 and 74, respectively, formed on the case 30, the movement of the bearing 64 is restricted in the axial direction due to the compound gear 42 and the bearing 66, and the movement of the bearing 66 is restricted in the axial direction due to the compound gear 42 and the bearing 64. The movement of the compound gear 42 is restricted in the axial direction by the bearings 64 and 66.

A plate spring 76 made of spring steel is interposed between an outer ring of the bearing 66 and the carrier CA2. The plate spring 76 has an annular shape press-molded from a plate material and is interposed in abutment with the end surface of the bearing 66 and the end surface of the spline portion 54 of the carrier CA2 at a plurality position in the rotational direction (circumferential direction). The plate spring 76 biases the carrier CA2 in a pressing manner toward the partition wall 30*a* in parallel with the shaft center by using the bearing 66 restricted in movement in the axial direction as a foundation. Therefore, the retention position of the carrier CA2 is properly maintained and the engagement positions of gears of the second planetary gear device 20 become proper. The plate spring 76 corresponds to a play reducing device of the present invention that reduces a play in the thrust direction formed between the carrier CA2 and the case 30 in the shaft center direction (thrust direction).

Figure 5:
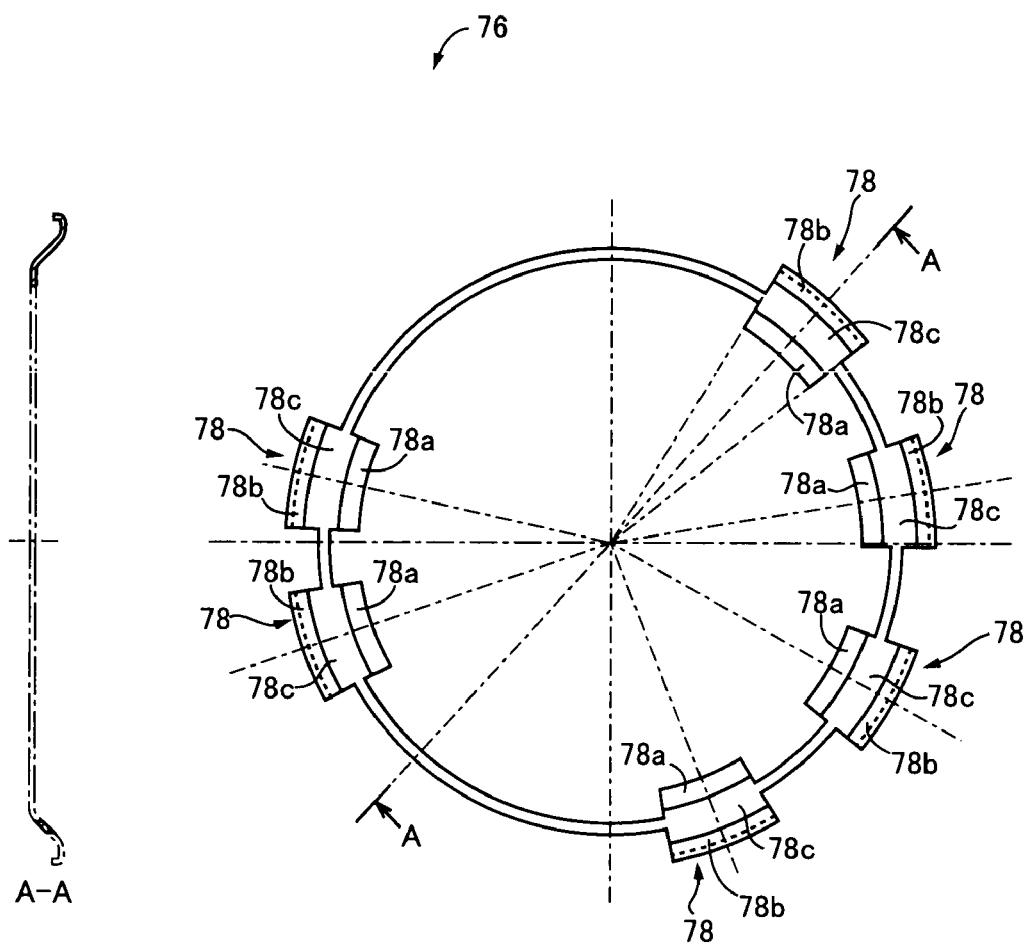
FIG. 5 is a part diagram for explaining a specific shape of a plate spring depicted in FIG. 2.

FIG. 5 is a part diagram for explaining a shape of the plate spring 76. As depicted in FIG. 5, the plate spring 76 has six pressing portions 78 formed in the rotational direction (circumferential direction). The pressing portions 78 are formed at the positions corresponding in the circumferential direction to a plurality of the spline teeth 60 formed on the spline portion 54 of the carrier CA2. The pressing portion 78 includes an inside abutting surface 78*a* for abutment with the spline tooth 60 of the carrier CA2 on the inner periphery side, an outer abutting surface 78*b* for abutment with the end surface of the bearing 66 (outer ring, outer race) on the outer periphery portion, and a spring portion 78*c* that links the inside abutting surface 78*a* and the outer abutting surface 78*b* and that has a sloped surface for generating an elastic restoring force. Therefore, as depicted in FIG. 2, the outer periphery portion of the pressing portion 78 abuts on the end surface (outer ring, outer race) of the bearing 66 and the inner periphery portion locally abuts on a pressed portion P of the spline tooth 60 of the spline portion 54. Since the movement of the bearing 66 is restricted in the axial direction, the movement of the plate spring 76 abutting on the end surface of the bearing 66 is also restricted in the axial direction. The plate spring 76 is supported by the bearing 66 in the axial direction. Therefore, the plate spring 76 using the bearing 66 as a foundation to apply a plate spring load W (indicated by arrows of FIG. 3) to each of the spline teeth 60 of the carrier CA2 abutting on the outer circumferential abutting surfaces 78*b*, pressing the carrier CA2 against the side wall 30*a* of the case 30. The plate spring load W is obtained from experiment or calculation in advance to set thickness, shape, bend dimension, etc., related to the elastic modulus of the plate spring 76 such that the plate spring load can be generated.

The play formed in the thrust direction (axial direction) between the carrier CA2 and the partition wall 30 is reduced by pressing the carrier CA2 against the partition wall 30*a* with the plate spring 76 as above and a relative displacement is suppressed in the thrust direction between the carrier CA2 and the case 30. Since the carrier CA2 and the partition wall 30*a* are pressed against each other on a mutual contact surface 80 in association with the pressing, rotational fluctuations are suppressed in the circumferential direction (rotational direction) between the carrier CA2 and the partition wall 30*a* by a frictional force due to the pressing and, therefore, rattling is preferably suppressed that is caused by a collision of the carrier CA2 and the case 30 generated by a spline play that is a play in the rotational direction formed between the members. As the rotational fluctuations are suppressed and the rattling is suppressed, wear is suppressed that is associated with collisions between the carrier CA2 and the spline teeth 60 and the spline grooves 62 of the partition wall 30*a* (the case 30). Therefore, the interposing of the plate spring 76 reduces the play in the thrust direction between the carrier CA2 and the partition wall 30*a* of the case 30 and constrains the rattling due to reduction of a play in the thrust direction generated when the carrier CA2 and the case 30 collide in the thrust direction. Since the movement of the carrier CA2 is suppressed in the circumferential direction by a frictional force between the carrier CA2 and the case 30, the rattling sound due to reduction of a play formed in the circumferential direction is also suppressed. Since the plate spring 76 is supported by abutting on the end surface of the bearing 66, a part fixing the plate spring 76 such as a snap ring is not necessary, which facilitates assembling.

As described above, according to this embodiment, since the plate spring 76 is provided that acts as a play reducing device that presses the carrier CA2 against the case 30 to reduce a play in the thrust direction formed between the carrier CA2 and the case 30, a play is reduced in the thrust direction (axial direction) between the carrier CA2 and the case 30 and a relative displacement is suppressed in the thrust direction between the carrier CA2 and the case 30 to prevent the sound generated when the carrier CA2 and the case 30 collide in the thrust direction. A friction force between the carrier CA2 and the case 30 generated by pressing the carrier CA2 against the case 30 can constrain the rattling due to collisions of the carrier CA2 and the case 30 generated at a spline play formed in the circumferential direction (rotational direction) between the members.

According to this embodiment, since the play reducing device is the plate spring 76 interposed in abutment with the bearing 66 and the carrier CA2 to press the carrier CA2 against the case 30 (partition wall 30*a*), the pressing force of the plate spring 76 reduces a play in the thrust direction of the carrier CA2 and presses the carrier CA2 against the case 30 to restrict the movement in the circumferential direction with the friction force. Therefore, the rattling between the carrier CA2 and the case 30 and the fluctuation of the carrier CA2 in the thrust direction can effectively be suppressed. Since the plate spring 76 is disposed by abutting on the end surface of the bearing 66, a fixing member such as a snap ring for fixing the plate spring 76 is not necessary and the play reducing device can easily be configured without making a considerable change in a conventional structure.

According to this embodiment, the case 30 and the carrier CA2 are unrotatably held by forming the spline fitting between a plurality of the spline teeth 60 circumferentially formed on the outer periphery surface of the carrier CA2 and the spline grooves 62 circumferentially formed in the case 30 at the positions corresponding to the spline teeth 60. Although this always leads to formation of gaps (plays) between the spline teeth 60 of the carrier CA2 and the spline grooves 62 of the case 30 and causes the rattling generated between the carrier CA2 and the case 30, the plate spring 76 constrains the rattling to implement the practical vehicle power transmission device 10.

According to this embodiment, since the carrier CA2 is pressed against the case 30, the position of the carrier CA2 can properly be maintained and gear noise is reduced as the engagement positions become proper in the gears of the second planetary gear device 20.

Another embodiment of the present invention will then be described. In the following description, the portions common to the embodiment are denoted by the same reference numerals and will not be described.

Second Embodiment

Figure 6:
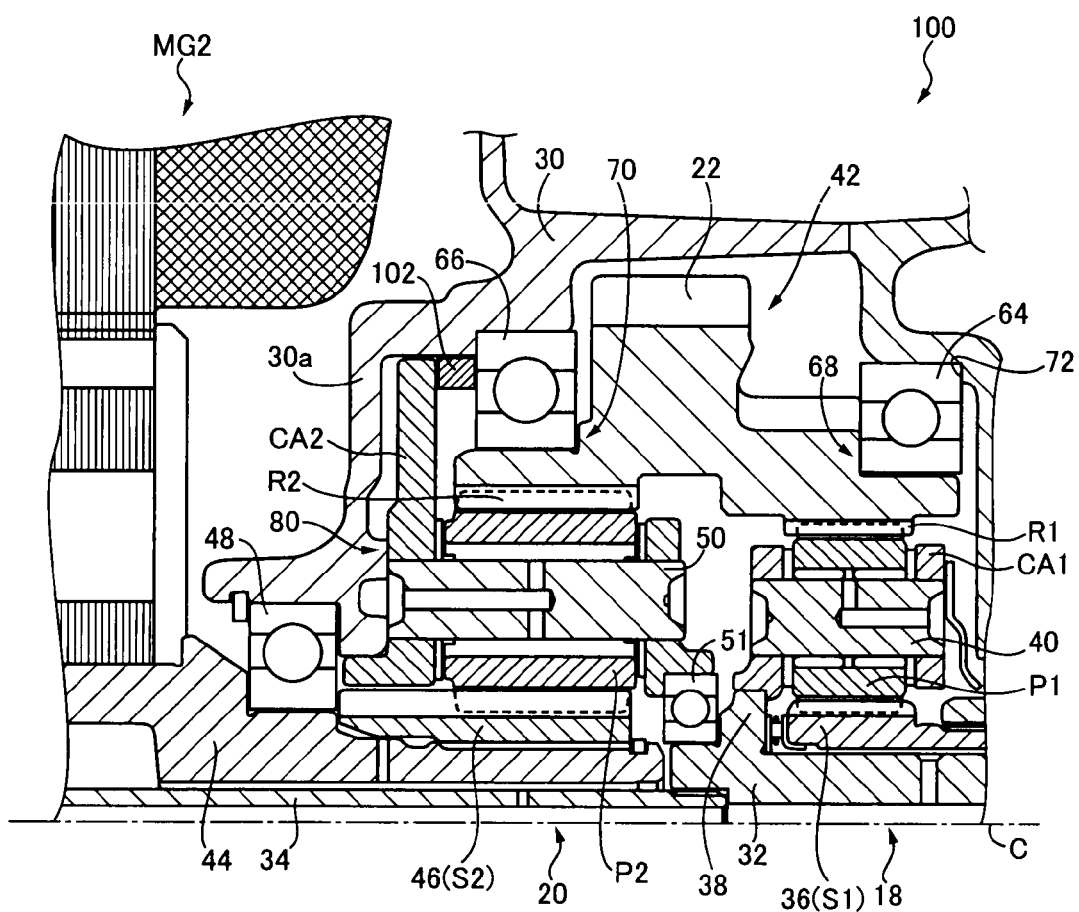
FIG. 6 is a cross-section view of a relevant portion of a power transmission device of another embodiment of the present invention, corresponding to FIG. 2.

FIG. 6 is a cross-section view of a relevant portion of a power transmission device 100 of another embodiment of the present invention. In this embodiment, a spacer 102 (corresponding to the play reducing device of the present invention) is interposed between the carrier CA2 and the bearing 66 instead of the plate spring 76 acting as the play reducing device of the embodiment. The spacer 102 is an annular member made of metal, etc., and is interposed in abutment with the spline teeth 60 of the carrier CA2 and the end surface of the bearing 66. Since the interposing of the spacer 102 generates predetermined preload acting in the axial direction between the carrier CA2 and the bearing 66, the carrier CA2 is pressed toward the case 30 (the partition wall 30a) based on the preload and a play is reduced in the thrust direction between the carrier CA2 and the case 30. As the carrier CA2 and the case 30 are pressed by the preload, the rotational fluctuations are suppressed (in other words, the spline play is suppressed) in the circumferential direction between the carrier CA2 and the case 30 by the frictional force thereof and the rattling is suppressed.

To interpose the spacer 120 between the spline teeth 60 of the carrier CA2 and the end surface of the bearing 66 without a gap when generating the preload, an axial length (width diameter) of the spacer 102 is designed to be longer by a minute dimension than a space formed between the spline teeth 60 of the carrier CA2 and the end surface of the bearing 66. With the above configuration, the spacer 102 acts in the same way as the plate spring 76, thus ensuring the same effect as the embodiment.

As described above, according to this embodiment, since the spacer 102 is interposed in abutment with the bearing 66 and the carrier CA2 such that a preload is generated, the carrier CA2 is pressed against the case 30 by the preload to reduce a play in the thrust direction, and the rotational fluctuations of the carrier CA2 and the case 30 are restricted in the circumferential direction by a friction force between the carrier CA2 and the case 30 generated due to the preload. Therefore, the rattling between the carrier CA2 and the case 30 and the fluctuations of the carrier CA2 in the thrust direction can effectively be suppressed. Since the function of the play reducing device is implemented by only interposing the spacer 102, the play reducing device can easily be configured without making a considerable change in a conventional structure.

Third Embodiment

Figure 7:
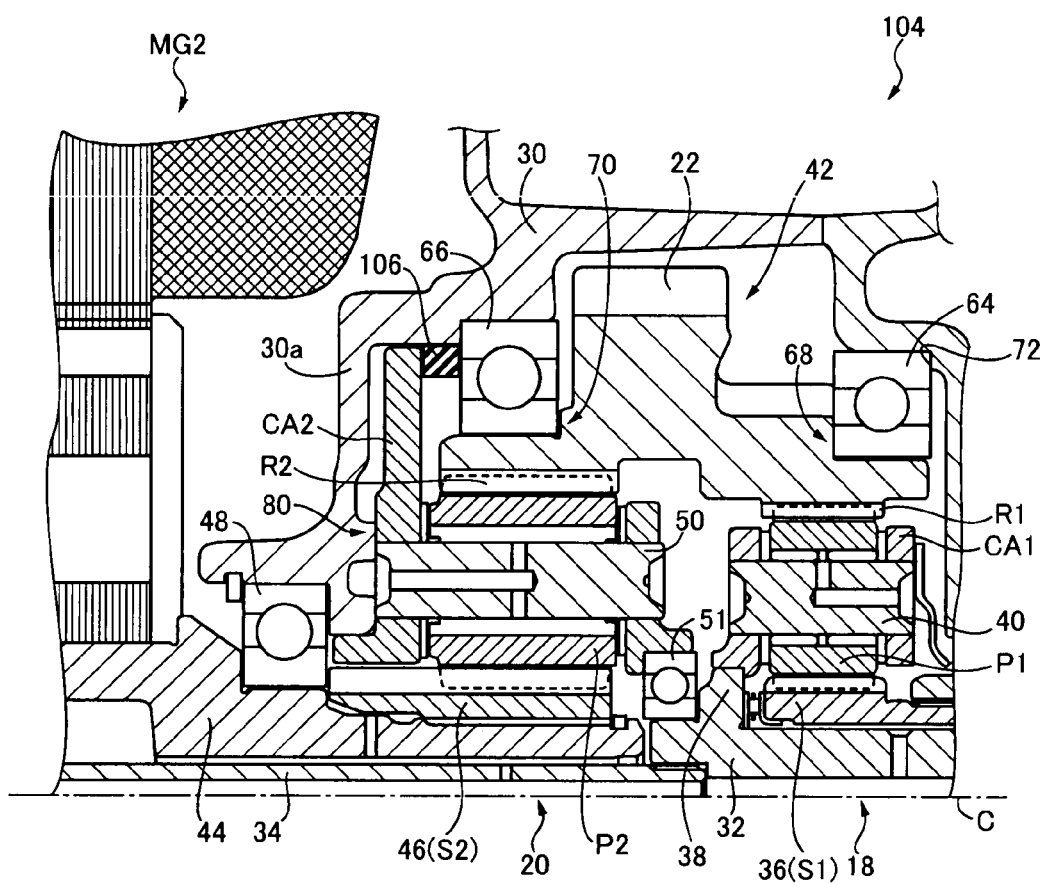
FIG. 7 is a cross-section view of a relevant portion of a power transmission device of yet another embodiment of the present invention, corresponding to FIG. 2.

FIG. 7 is a cross-section view of a relevant portion of a power transmission device 104 of yet another embodiment of the present invention. In this embodiment, an elastic member 106 (corresponding to the play reducing device of the present invention) made of, for example, rubber material is interposed as the play reducing device between the carrier CA2 and the bearing 66. The elastic member 106 is interposed in a compressed state in abutment with the spline teeth 60 of the carrier CA2 and the end surface of the bearing 66, generating predetermined preload (elastic restoring force) acting in parallel with the shaft center. Therefore, the carrier CA2 is pressed against the case 30 (the partition wall 30a) based on the preload and a play is reduced in the thrust direction between the carrier CA2 and the case 30. As the carrier CA2 and the case 30 are pressed by the preload, the rotational fluctuations are suppressed (in other words, the spline play is suppressed) in the circumferential direction between the carrier CA2 and the case 30 by the frictional force thereof and the rattling is suppressed. With the above configuration, the elastic member 106 acts in the same way as the plate spring 76, thus ensuring the same effect as the embodiment.

As described above, according to this embodiment, since the elastic member 106 is interposed in abutment with the bearing 66 and the carrier CA2 such that a preload is generated, the carrier CA2 is pressed against the case 30 by the preload to reduce a play in the thrust direction, and the rotational fluctuations of the carrier CA2 and the case 30 are restricted in the circumferential direction by a friction force between the carrier CA2 and the case 30 generated due to the preload. Therefore, the rattling between the carrier CA2 and the case 30 and the fluctuations of the carrier CA2 in the thrust direction can effectively be suppressed. Since the function of the play reducing device is implemented by only interposing the elastic member 106, the play reducing device can easily be configured without making a considerable change in a conventional structure.

Fourth Embodiment

Figure 8:
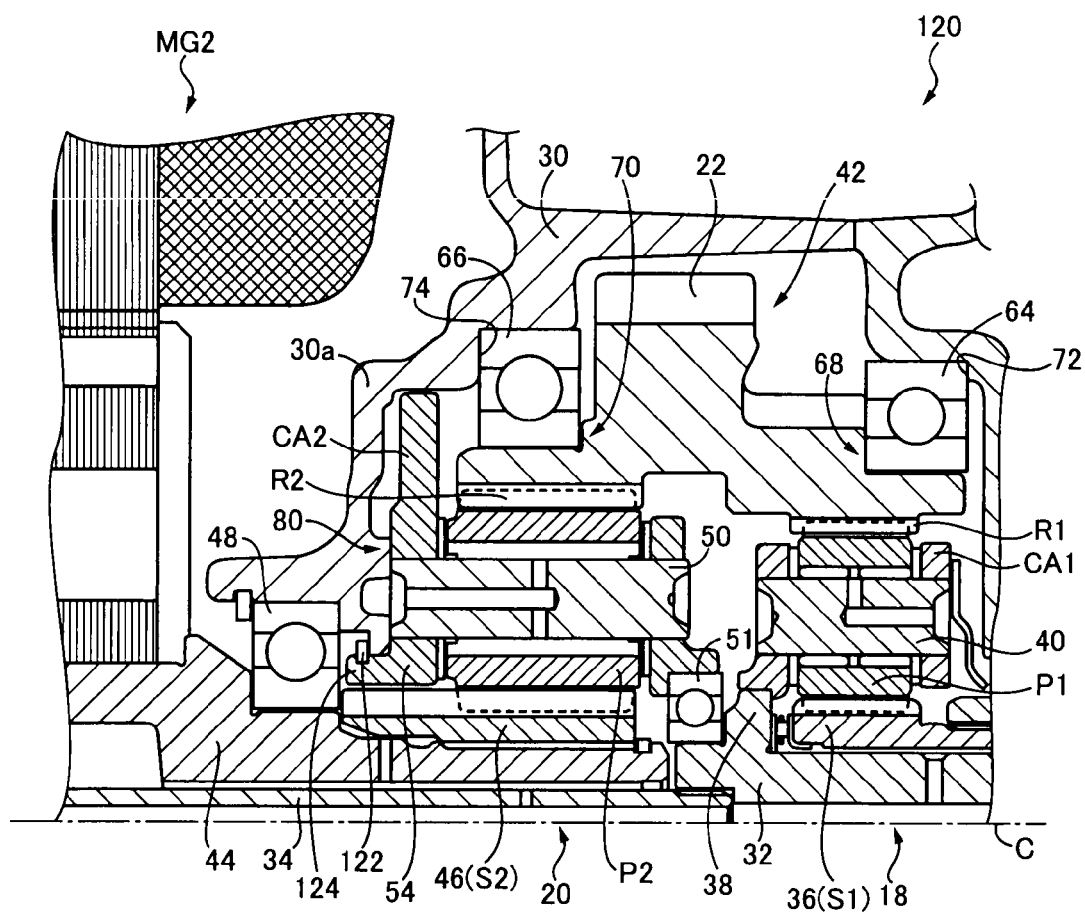
FIG. 8 is a cross-section view of a relevant portion of a power transmission device of a further embodiment of the present invention, corresponding to FIG. 2.
Figure 9:
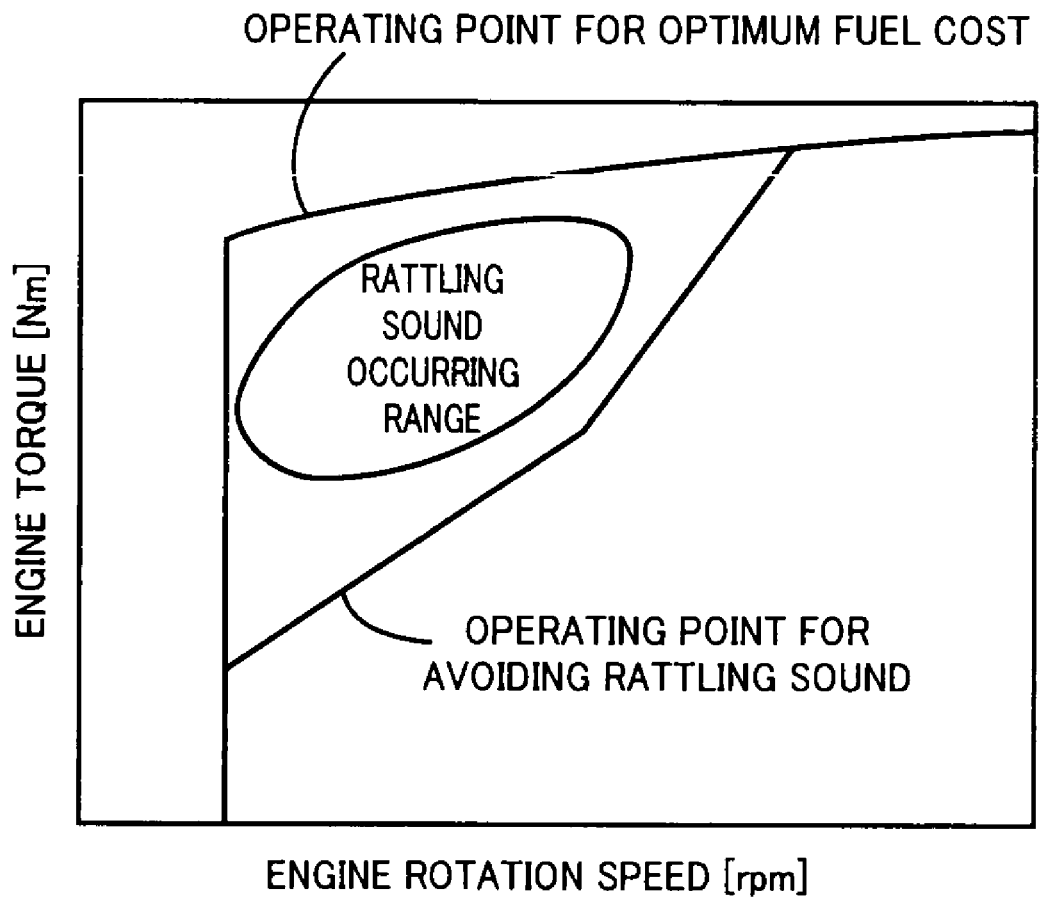
FIG. 9 is a diagram for explaining an operating range of an engine when the engine is operated while avoiding a rattling occurring range to prevent rattling.

FIG. 8 is a cross-section view of a relevant portion of a power transmission device 120 of a further embodiment of the present invention. In this embodiment, an annular snap ring 122 (corresponding to the play reducing device of the present invention) restricting the axial movement of the carrier CA2 is disposed as the play reducing device. The snap ring 122 is fitted into an annular groove formed in an outer periphery surface of a cylindrical protruding portion 124 extending in parallel with the shaft center from the inner periphery end of the carrier CA2 in the spline portion 54. As depicted in FIG. 8, the end surface of the snap ring 122 abuts on the partition wall 30a of the case 30 and the partition wall 30a (the case 30) is pinched and retained between the snap ring 122 and the spline portion 54 of the carrier CA2. With the above configuration, the carrier CA2 is pressed against the case 30 (the partition wall 30a) by the pinching force acting in parallel with the shaft center generated by fitting the snap ring 122. Therefore, as the carrier CA2 is pressed against the case 30, a play is reduced in the thrust direction, and the rotational fluctuations are suppressed (in other words, the spline play is suppressed) in the circumferential direction between the carrier CA2 and the case 30 based on the friction force frictional force due to the pressing, thereby suppressing the rattling.

To pinch the partition wall 30a (the case 30) without a gap by the snap ring 122 and the carrier CA2 when generating the pinching force, an axial length of a portion of the partition wall 30a pinched by the snap ring 122 and the carrier CA2 is designed to be longer by a minute dimension than an axial length of a space for pinching the partition wall 30a (the case 30) formed between the end surface of the snap ring 122 and the end surface of the carrier CA2. With the above configuration, the snap ring 122 acts in the same way as the plate spring 76, thus ensuring the same effect as the embodiment.

As described above, according to this embodiment, since the snap ring 122 is fitted into the carrier CA2 and pinches the case 30 with the carrier CA2, the carrier CA2 is pressed against the case 30 to reduce a play in the thrust direction, and the rotational fluctuations of the carrier CA2 and the case 30 are restricted in the circumferential direction by a friction force associated with the pinching force generated when the case 30 is pinched. Therefore, the rattling between the carrier CA2 and the case 30 and the fluctuations of the carrier CA2 in the thrust direction can effectively be suppressed.

Although the embodiments of the present invention have been described with reference to the drawings, the present invention is applicable to other aspects.

For example, although the snap ring 122 is fitted into the carrier CA2 and configured to pinch the case 30 (the partition wall 30a) to press the carrier CA2 against the case 30 in the embodiment, in contrast, the snap ring may be fitted into the case 30 and configured to pinch the carrier CA2 to press the carrier CA2 against the case 30. The above structure can acquire the same effect as the embodiments of the present invention.

Although the plate spring 76, the spacer 102, the elastic member 106, or the snap ring 122 is used as the play reducing device in the embodiments, other configurations may be used such as applying a preload to a taper bearing to press the carrier CA2 against the case 30.

Although the five pinion gears P2 of the second planetary gear device 20 are circumferentially disposed in the embodiments, the number is not necessarily restricted to five and is freely modifiable.

Although the sun gear S2 of the second planetary gear device 20 is coupled to the second electric motor MG2 and the ring gear R2 is coupled to the output gear 22 in the embodiments, the coupling relationship is not restricted to the above relationship and is freely modifiable.

Although the ring gear R2 is formed on the compound gear 42 in the embodiments, the ring gear R2 may not necessarily be formed on the compound gear 42 and is freely modifiable as long as the carrier CA2 is brought into the spline fitting with the case 30.

Although the power transmission device 10 is a hybrid type power transmission device having the first electric motor MG1 and the second electric motor MG2 in the embodiments, the present invention is not necessarily restricted to a hybrid type power transmission device and is applicable to other types of power transmission device such as a power transmission device consisting of a step type automatic transmission including a planetary gear device, for example.

It is to be understood that the above are merely exemplary embodiments and that the present invention may be implemented in variously modified or altered forms based on the ordinary knowledge of those skilled in the art.

What is claimed is:

1. A vehicle power transmission device comprising:
   a carrier of a planetary gear device brought into spline fitting with a case that is a non-rotating member to stop rotating and a ring gear of the planetary gear device rotatably supported by the case via a bearing, and
   a play reducing device that presses the carrier against the case to reduce a play in a thrust direction formed between the carrier and the case, wherein the play reducing device abuts the bearing and the carrier to press the carrier against the case.

2. The vehicle power transmission device of claim 1, wherein the play reducing device is a plate spring interposed in abutment with the bearing and the carrier to press the carrier against the case.

3. The vehicle power transmission device of claim 1, wherein the play reducing device is a spacer interposed in abutment with the bearing and the carrier to generate a preload to press the carrier against the case.

4. The vehicle power transmission device of claim 1, wherein the play reducing device is an elastic member interposed in abutment with the bearing and the carrier to generate a preload to press the carrier against the case.

5. The vehicle power transmission device of claim 1, wherein the case and the carrier are unrotatably held by forming spline fitting between a plurality of spline teeth circumferentially formed on an outer periphery surface of the carrier and spline grooves circumferentially formed in the case at positions corresponding to the spline teeth.

6. The vehicle power transmission device of claim 1, wherein the play reducing device is interposed in abutment with the case.

7. The vehicle power transmission device of claim 1, wherein the play reducing device directly contacts the bearing and the carrier to press the carrier against the case.

8. A vehicle power transmission device comprising:
   a carrier of a planetary gear device brought into spline fitting with a case that is a non-rotating member to stop rotating and a ring gear of the planetary gear device rotatably supported by the case via a bearing, and
   a play reducing device that presses the carrier against the case to reduce a play in a thrust direction formed between the carrier and the case, wherein the play reducing device is a snap ring fitted into one member of the case and the carrier to pinch the other member with the one member to press the carrier against the case.

9. The vehicle power transmission device of claim 8, wherein the snap ring is embedded into the carrier and forms a groove in which a portion of the casing is disposed, in an axial direction, between the snap ring and the carrier, such that the snap ring causes the portion of the casing to be pinched, in the axial direction, between the carrier and the snap ring.

* * * * *